United States Patent [19]

Curchod

[11] 4,174,760
[45] Nov. 20, 1979

[54] SCALE CONSTRUCTION
[75] Inventor: Donald B. Curchod, San Jose, Calif.
[73] Assignee: Nortron Corporation, Sunnyvale, Calif.
[21] Appl. No.: 855,894
[22] Filed: Nov. 30, 1977
[51] Int. Cl.² .............................................. G01G 3/14
[52] U.S. Cl. ................................. 177/211; 73/141 A; 177/229
[58] Field of Search ................ 177/211, DIG. 9, 229; 73/141 A; 338/5, 6

[56] References Cited
U.S. PATENT DOCUMENTS

| | | | |
|---|---|---|---|
| 2,439,146 | 4/1948 | Ruge | 177/211 X |
| 2,499,033 | 2/1950 | Oberholtzer | 177/211 X |
| 2,666,262 | 1/1954 | Ruge | 177/211 X |
| 3,616,690 | 11/1971 | Harden | 177/211 X |
| 3,853,191 | 12/1974 | Yamagiwa | 177/210 R |
| 3,993,150 | 11/1976 | Brosh | 177/211 |
| 4,125,168 | 11/1978 | Ormond | 177/211 |

Primary Examiner—Joseph W. Hartary
Attorney, Agent, or Firm—Flehr, Hohbach, Test, Albritton & Herbert

[57] ABSTRACT

A scale construction comprises a pair of spaced substantially rigid plates offset with respect to each other and supported by means of flexure members extending therebetween. A strain gauge is carried between the plates. In one embodiment a flexure member carries the strain gauge means. Electrical bridge circuitry coupled to the strain gauge supplies a digital display of the weight supported on the top plate. In addition, one of the legs of the bridge circuitry is adjustable so as to be able to provide a representation that there is zero weight on the top plate when all weight has been removed therefrom in order to calibrate the scale.

9 Claims, 14 Drawing Figures

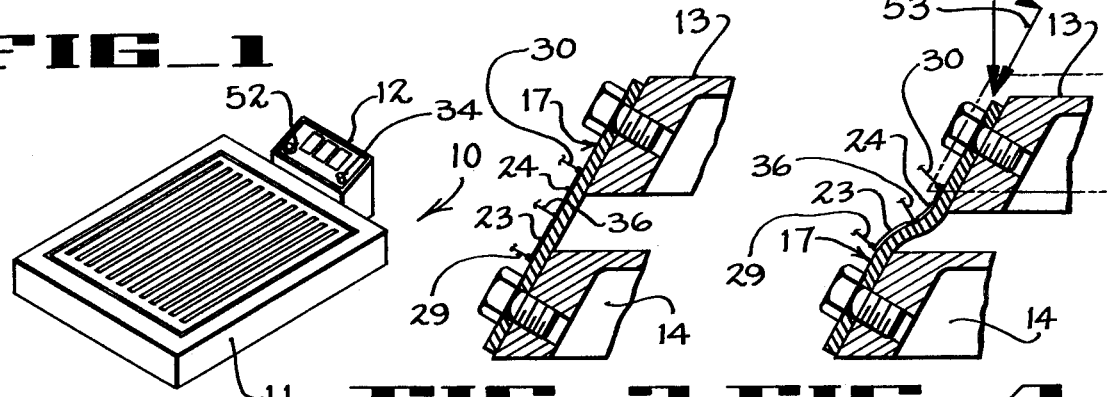
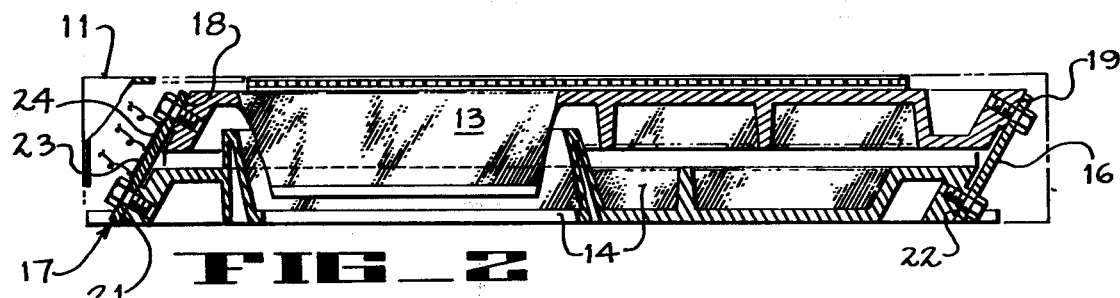
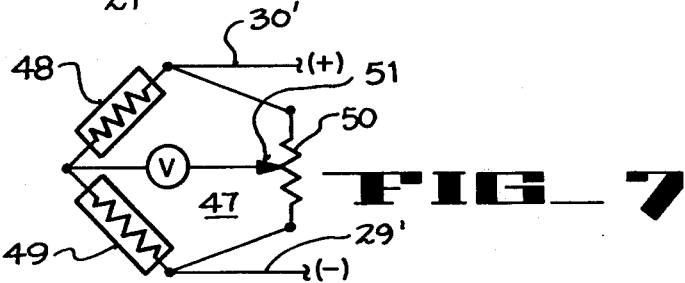
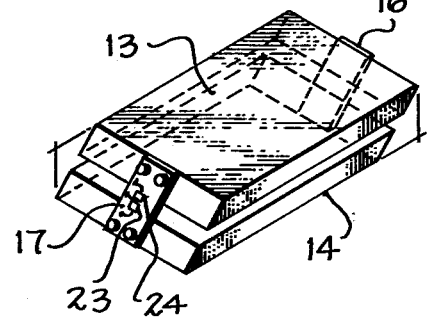
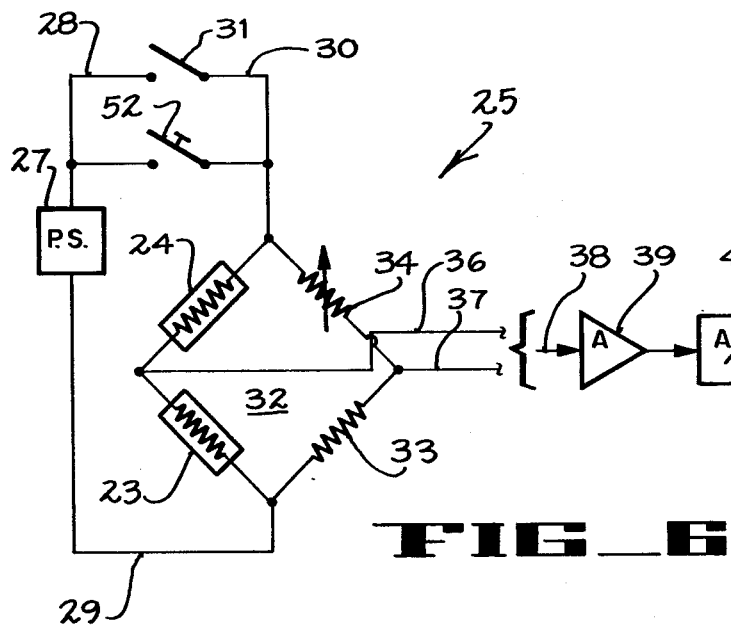

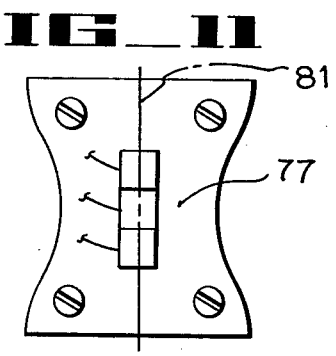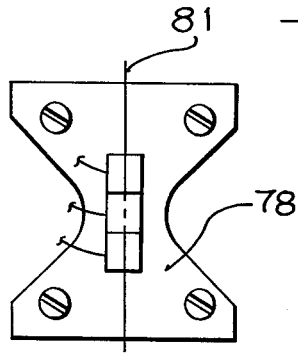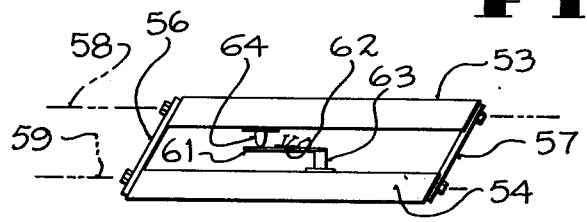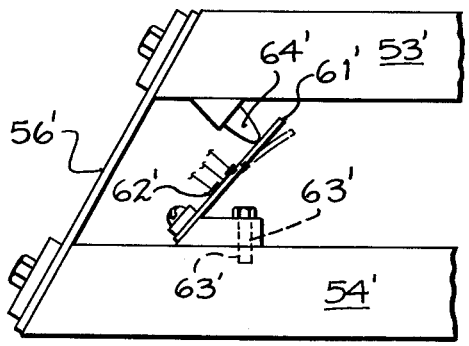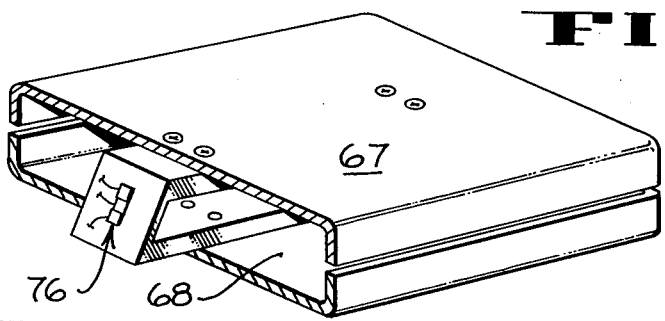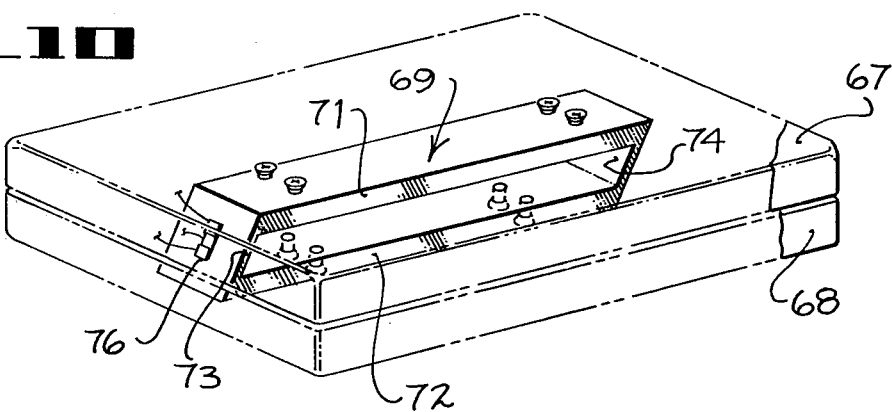

4,174,760

SCALE CONSTRUCTION

BACKGROUND OF THE INVENTION

This invention pertains to scale constructions and more particularly to scale constructions employing strain gauges.

Heretofore a number of problems have existed with regard to the provision of a marketable scale including the range normally provided to weigh people and employing a digital readout display. Typically, most such attempts have been characterized by the incorporation of large numbers of strain gauges and mechanical complexity. Accordingly the cost of the scale has risen commensurately.

In addition, it has been observed that a different reading can be achieved by placing a person's weight on different corners or edges of the top weightsupporting platform so that the scale is unstable or unreliable. This constitutes a continuing problem with respect to scales incorporating strain gauges as previously constructed. Accordingly, the present construction provides a stabilized output value notwithstanding the point of support on the scale.

The foregoing and other problems will be noted further below.

SUMMARY OF THE INVENTION AND OBJECTS

In general a scale construction has been provided including first and second means defining spaced load bearing planes one above the other. Flexure means interposed between the first and second means are disposed at an oblique angle thereto to permit one of the first or second means to move laterally relative to the other and closer to the other in response to application of a body upon the top one of the first and second means in weight transfer relation thereto. Strain gauge means is carried between the planes so as to be responsive to weight applied to the top one of said first and second means. Means coupled to the strain gauge means serves to detect the weight of the body disposed in weight transfer relation to the upper one of the first and second means.

In general it is an object of the present invention to provide an improved scale construction.

It is another object of the present invention to provide a scale having an electrical or electronic digital readout of the weight on the scale in which the construction of the scale serves to eliminate inconsistent readings.

It is a further object of the present invention to provide a scale construction of a type employing strain gauge means in which means are provided to set the scale to provide a zero reading on a readout display when all weight has been removed from the scale.

The foregoing and other objects of the invention will become more readily evident from the following detailed description of preferred embodiments when considered in conjunction with the drawings.

BRIEF DESCRIPTION OF THE DRAWINGS

FIG. 1 shows a diagrammatic perspective view of a digital scale, according to the invention;

FIG. 2 shows a diagrammatic side elevation section view showing the scale construction, according to the invention;

FIG. 3 shows an end portion of the scale construction when in a relaxed or unloaded position;

FIG. 4 shows a diagrammatic elevation view of an end portion of the scale construction under exaggerated load for purposes of explanation;

FIG. 5 shows a diagrammatic perspective view of the assembly shown in FIG. 2, according to the invention;

FIG. 6 shows a diagrammatic circuit layout for operating the scale construction according to the invention;

FIG. 7 shows a portion of a diagrammatic circuit for operating the scale construction according to the invention;

FIGS. 8A and 8B each show a diagrammatic side elevational view of a scale construction according to another embodiment of the invention;

FIG. 9 shows a diagrammatic perspective view in section according to the embodiment of the invention shown in FIG. 10;

FIG. 10 shows a diagrammatic perspective view of a scale construction according to another embodiment of the invention; and FIGS. 11, 12 and 13 show diagrammatic elevation views of various flexure elements carrying strain gauge means thereon.

DETAILED DESCRIPTION OF PREFERRED EMBODIMENTS

The scale construction 10 as shown assembled in FIG. 1 comprises an outer shell 11 which overlays, in nested relation, the interior of the scale construction as described further below. Scale 10 includes a window for the digital readout display 12 which operates in response to application of weight to the scale.

In general, and as shown best in FIG. 2 scale 10 comprises a pair of substantially rigid castings or plates 13, 14 disposed in closely spaced relation with the top plate offset with respect to the position of the bottom plate. Relatively narrow flexure members 16, 17 normally of steel are bolted or otherwise fixed securely to the inclined parallel surfaces 18, 19 and 21, 22 so as to dispose flexure members 16, 17 in substantially parallel planes at an oblique angle to the parallel load-bearing planes of plates 13, 14. Plate 13 supports cover 11 thereabove.

As shown in FIG. 5 flexure members 16, 17 have a relatively narrow width, x, relative to the width, y, and to the length, z, of plates 13, 14 so as to minimize any tendency of flexures 16, 17 to twist rather than to move as a parallelogram. Thus, flexures 16, 17 have a width, x, of the order of less than half the width, y, and/or length, z, of plates 13, 14. This width, x, is selected so as to prevent tipping or twisting by allowing only parallel translation of plate 13 with respect to plate 14, thus permitting members 16, 17 to bend to influence the strain gauge elements 23, 24 carried on flexure member 17.

Strain gauge means such as the strain gauge elements 23, 24 are applied to a face of one of the flexure members 16, 17 for purposes of generating an electrical response to application of weight to top plate 13 via cover 11.

Means coupled to strain gauge elements 23, 24 serves to detect the value of the weight supported by the upper plate 13 as now to be described, together with means coupled to the last named means for digitally displaying the value of the weight in a manner to be observed by the user of the scale.

Accordingly, as shown in FIGS. 3 and 4, since the flexure members 16, 17 are disposed at an oblique angle with respect to the load bearing planes of plates 13, 14, when no weight is present the flexure panels such as 17 will be relaxed as shown, but upon the application of weight to top plate 13, a component of force acting in the direction of arrow 26 serves to cause the upper end of panel 17 to move to the right as shown so as to introduce an "S" shaped curvature into member 17 in the region where strain gauge elements 23, 24 are located.

As is known the strain gauges when subjected to forces of this kind serve to provide a varying electrical response having an analog value dependent upon the degree to which they are deformed.

With respect to FIG. 6, a circuit 25 is shown in which a power supply 27, such as dry cell batteries, is connected to operate circuit 25 via a first connection 28 and a second connection 29. Connections 29, 30 are coupled to bridge circuit 32 while a switch 31 of known design couples connection 30 to conductor 28 in response to application of weight to top plate 13 so as to activate circuit 25.

As is noted, two legs of bridge circuit 32 include the strain gauge elements 23, 24 while the other two legs comprise resistors 33, 34, the latter constituting a variable resistor for purposes of establishing a zero reading when all weight has been removed from the scale.

As shown in FIG. 7 a balance bridge 47 adjustment employs a pair of strain gauge elements 48, 49 to form two legs of the bridge while a potentiometer 50 joins the ends of the other two legs. As thus arranged the voltage across the bridge, as represented by the letter "V", can be made to vary by varying the wiper 51. Such a bridge 47 can be employed in the circuit 25 for bridge 32. Power is applied to bridge 47 via lead 30' and connection 29'.

The output of bridge circuit 32 appears between leads 36, 37. This output, as shown in FIG. 6, is connected via line 38 to an amplifier 39 and then to an analog to digital converting circuit of known construction 41. The output on line 42 from circuit 41 accordingly constitutes a digital output representative of the weight on the scale. This output is fed to a coding circuit 43 of known type which serves to code the digital input to provide an appropriate controlling input via lin 44 for a digital or electrical readout display on device 46. In the present instance a seven segment 3½ digit semi-conductor device has been employed.

As noted above, resistor 34 is variable so as to provide a "zero adjust" to the scale. A manually operated switch 52 serves to couple connection 28 to bridge circuit 32 to activate the system without applying weight to top plate 13 so that resistor 34 can be varied to provide a readout value of zero on display 46.

Strain gauge elements 23, 24 are disposed on opposite ends of the active length of flexure member 17 so as to cancel any output derived from the component of force in the direction of arrow 53 in FIG. 4. The elements 23, 24 can be mounted on a common carrier and applied together as a single strain gauge. The simple scale configuration described above serves to provide extra rigidity not found in scales of the type described and also provides a stable weighing platform whereby the weight can be disposed at any location on the upper surface of plate 13 without causing a change in the reading of the output display 46. In short, the connecting flexure members 16, 17 provide lateral rigidity so that the top plate cannot tip or twist with respect to the bottom plate and by forming the parallelogram arrangement both flexures will move together. Accordingly, the only effective force acting on the scale constitutes the component of force indicated by the arrow 26 which tends to flex or bend members 16, 17.

It has been observed that by using the relatively narrow flexure members 16, 17 having a width, x, of the order of less than half the width, y, or length, z, of plates 13, 14 it is possible to construct a scale using strain gauges on one side of one of the flexures and obtain an accurate measurement of the weight regardless of where the weight is applied to plate 13.

While the flexure member 16, 17 should be relatively narrow compared to the width of plates 13, 14 a preferred relationship is defined where flexures 16, 17 are two inches wide and plate 13 is eight inches wide.

In addition a preferred angle of inclination of flexures 16, 17 is of the order of 30° off vertical. The scale becomes more sensitive as the angle off vertical is increased.

According to another embodiment of the invention as shown in FIG. 8 a pair of beams 53, 54 coupled at their ends by flexure elements 56, 57 form a parallelogram assembly whereby the load bearing plane 58 is arranged to move forwardly and closer to the support plane 58 defined by beam 54.

Thus, flexure means 56, 57 are interposed between first and second means defining spaced load bearing planes 58, 59 one above the other so as to permit one of the planes 58, to move laterally relative to the other and closer to the other in response to application of weight upon the top one 53 of the first and second means.

It is to be noted that the strain gauge is not carried by flexure elements 56, 57 in the embodiment shown in FIG. 8 but, in turn, is carried between planes 58, 59. Strain gauge means carried between planes 58, 59 comprises a flexure element 61 carrying a strain gauge 62 supported in cantilever style by means of the mounting block 63 whereby a downwardly depending fixed depressor 64 extending beneath beam 53 serves to flex element 61 to apply a strain to gauge 63.

FIG. 8B shows a variation of the embodiment in FIG. 8A. Accordingly, the reference numerals remain the same but with the addition of a prime mark (') to indicate substantially similar functions.

According to another embodiment as shown in FIGS. 9 and 10 a scale construction 66 comprises a pair of flanged top and bottom covers 67, 68 adapted to receive a weight to be measured. Covers 67, 68 are maintained in spaced apart relation by means of the scale unit 69 in which first and second beam portions 71, 72 together with flexure portions 73, 74 comprise a unitary body formed as a parallelogram. A strain gauge 76 carried on the end of flexure 73 serves to provide information relative to the degree of deformation of flexure 73 in response to disposition of a weight upon top plate 67.

It has been observed that the flexures such as flexures 17, 56 or the like may be of varying shapes as shown in FIGS. 11, 12 and 13 so long as they are symmetrical about a plane 81. These flexures 77, 78 and 79 are each shown with strain gauge means disposed thereon substantially equally to each side of plane 81 normal to the flexures.

Accordingly, there has been provided an improved scale construction.

I claim:

1. A scale construction comprising a pair of substantially rigid plates disposed in spaced relation one above the other, said plates defining spaced load-bearing planes, semi-rigid flexure members connected between the ends of said plates to support one plate spaced from the other, said members being disposed at a common oblique angle to the load bearing planes to define a parallelogram when taken with said planes, strain gauge means carried by one of said flexure members, and means responsive to said strain gauge means serving to indicate the weight of a body disposed in weight transfer relation to the top one of said plates.

2. A scale construction as in claim 1 in which said flexure members have a width of the order of less than half the width of the ends of said plates.

3. A scale construction comprising a pair of substantially rigid plates disposed in spaced apart relation one above the other, the upper plate serving to support a body in weight transfer relation thereto, said plates defining spaced load-bearing planes, each plate having end edges, said end edges being tapered to lie in substantially parallel relation inclined to the horizontal, a flexure member secured to said end edges of said plates to extend between said plates for supporting said plates in spaced relation, strain gauge means carried by one of said flexure members, means coupled to said strain gauge means serving to detect the value of a weight supported by the upper plate and to display a digital number representing said value.

4. A scale construction as in claim 3 further comprising means coupled to said last named means for adjusting the digital number to zero when no weight is carried on the upper plate.

5. A scale construction as in claim 4 wherein said adjusting means includes a bridge circuit including as legs thereof strain gauge elements and means for varying the output voltage across the bridge.

6. A scale construction as in claim 3 further in which the last named means includes electrical means serving to detect the value of the weight supported by the upper plate.

7. A scale construction comprising a pair of substantially rigid plates disposed in spaced relation one above the other, said plates defining spaced load-bearing planes, semi-rigid flexure members connected between the ends of said plates to support the top plate from and offset with respect to the position of the bottom plate to permit the top plate to approach the bottom plate in response to placement of a body in weight transfer relation anywhere upon said top plate to cause all said flexure members to flex in a common direction, strain gauge means carried by one of said flexure members, means coupled to said strain gauge means serving to detect the value of the weight of a body disposed in weight transfer relation to the upper plate, and means coupled to the last named means for presenting said value of such weight in a manner to be observed by the user of said scale.

8. A scale construction comprising first and second means defining spaced load bearing planes one above the other, flexure means interposed between said first and second means disposed at an oblique angle to said planes to permit one of said first and second means to advance relative to the other and move closer to said other in response to application of a body disposed in weight transfer relation to the top one of said first and second means, strain gauge means carried between said planes, and means coupled to said strain gauge means serving to detect the weight of the body disposed in weight transfer relation to the upper one of said first and second means, said first and second means and said flexure means comprising a unitary body formed as a parallelogram.

9. A scale construction comprising first and second means defining spaced load bearing planes one above the other, flexure means interposed between said first and second means disposed at an oblique angle to said planes to permit one of said first and second means to advance relative to the other and move closer to said other in response to application of a body disposed in weight transfer relation to the top one of said first and second means, means comprising an elongate flexible element supported from only one end thereof by no more than one of said first and second means, the other of said first and second means carrying means disposed to strike the distal end of said flexible element for flexing same as said first and second means move toward each other, strain gauge means carried by said flexible element between said planes, and means coupled to said strain gauge means serving to detect the weight of the body disposed in weight transfer relation to the upper one of said first and second means.

* * * * *